(12) United States Patent
Ou et al.

(10) Patent No.: US 11,375,129 B2
(45) Date of Patent: Jun. 28, 2022

(54) LIGHT COMPENSATION METHOD AND DEVICE FOR CAMERA UNDER DISPLAY

(71) Applicant: Wuhan China Star Optoelectronics Semiconductor Display Technology Co., Ltd., Wuhan (CN)

(72) Inventors: Yangqi Ou, Wuhan (CN); Yang Zhou, Wuhan (CN); Mugyeom Kim, Wuhan (CN); Yong Zhao, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/496,423

(22) PCT Filed: Apr. 17, 2019

(86) PCT No.: PCT/CN2019/082965
§ 371 (c)(1),
(2) Date: Sep. 21, 2019

(87) PCT Pub. No.: WO2020/133814
PCT Pub. Date: Jul. 2, 2020

(65) Prior Publication Data
US 2021/0368085 A1 Nov. 25, 2021

(30) Foreign Application Priority Data
Dec. 29, 2018 (CN) .......... 201811643889.X (51) Int. Cl.
*G09G 5/10* (2006.01)
*H04N 5/235* (2006.01)
*G09G 3/3208* (2016.01)
*H04N 5/225* (2006.01)

(52) U.S. Cl.
CPC ......... *H04N 5/2352* (2013.01); *G09G 3/3208* (2013.01); *G09G 5/10* (2013.01); *H04N 5/2257* (2013.01)

(58) Field of Classification Search
CPC .. H04N 5/2352; H04N 5/2257; G09G 3/3208; G09G 5/10; G09G 2360/144
See application file for complete search history.

(56) References Cited

U.S. PATENT DOCUMENTS

| | | | | |
|---|---|---|---|---|
| 8,886,252 B2* | 11/2014 | Luke | ................ | H04M 1/72448 455/575.1 |
| 9,256,794 B2* | 2/2016 | Braithwaite | ......... | G06K 9/2018 |
| 9,570,019 B2* | 2/2017 | Musgrave | ............ | G09G 3/3208 |
| 9,842,549 B2* | 12/2017 | Musgrave | ............ | H04N 5/2351 |

(Continued)

*Primary Examiner* — Rodney Amadiz
(74) *Attorney, Agent, or Firm* — Nathan & Associates; Menachem Nathan (57) ABSTRACT

The present invention discloses a light compensation method and a device for a camera under a display, and the display is an organic light emitting diode (OLED) screen. The method comprises: acquiring an external light intensity sensed by the camera under the display only under an external light, wherein the external light intensity is a light intensity of the external light passing through the screen to reach the camera; and detecting whether the external light intensity can make the camera to form an image, and compensating the external light intensity according to a detection result using an internal light of the screen or a sensor of the camera.

18 Claims, 2 Drawing Sheets

(56) References Cited

U.S. PATENT DOCUMENTS

| | | | |
|---|---|---|---|
| 10,217,439 B2* | 2/2019 | Bonnier | G06F 3/038 |
| 10,997,928 B1* | 5/2021 | Wang | H05B 47/11 |
| 11,087,677 B2* | 8/2021 | Wu | G09G 3/3208 |
| 11,145,240 B2* | 10/2021 | Koo | G09G 3/3625 |
| 2012/0182276 A1* | 7/2012 | Kee | G09G 5/10 |
| | | | 345/207 |
| 2019/0228204 A1* | 7/2019 | Park | G09G 3/22 |
| 2020/0045218 A1* | 2/2020 | Rathour | H05B 47/19 |

* cited by examiner

LIGHT COMPENSATION METHOD AND DEVICE FOR CAMERA UNDER DISPLAY

FIELD OF INVENTION

The present invention relates to the field of display screen technologies, and in particular, to a light compensation method and a device for a camera under a display, and the display is an organic light emitting diode (OLED) screen.

BACKGROUND OF INVENTION

Unlike traditional liquid crystal display (LCD) displays, OLED display technology eliminates the need for backlights and uses very thin organic coatings and glass substrates that illuminate when current is passed through. Moreover, the OLED display screen can be made lighter and thinner, and the OLED technology develops a larger viewing angle and can significantly save power.

Under the current trend of full-screen display, although various mobile phone manufacturers have proposed a variety of solutions, the front opening is always a problem that cannot be solved. Therefore, notch, water drop screen, lifting camera and other design solutions emerge in an endless stream. However, in order to achieve a true full screen, current mobile phone manufacturers are actively developing an under-screen camera technology, that is, the front camera is placed at the bottom of the screen, but there are certain problems with transparency, resolution, etc. Although the substrate of the flexible OLED screen itself is a "transparent plastic," if the camera is placed under the OLED screen and can be well imaged, the transmittance of the screen needs at least 80%. However, the current technology can only achieve about 40%, which makes the light intensity received by the under-screen camera weak, which is not conducive to imaging.

TECHNICAL PROBLEM

The embodiment of the present invention provides an light compensation method and a device for a camera under an OLED screen, so as to solve the problem that the light intensity received by the existing under-screen camera is weak, which is not conducive to imaging.

TECHNICAL SOLUTION

The present invention provides a light compensation method for a camera under a display, and the display is an organic light emitting diode (OLED) screen, comprising:

acquiring an external light intensity sensed by the camera under the display only under an external light, wherein the external light intensity is a light intensity of the external light passing through the screen to reach the camera; and detecting whether the external light intensity can make the camera to form an image, and compensating the external light intensity according to a detection result using an internal light of the screen or a sensor of the camera.

Further, the step of detecting whether the external light intensity can make the camera to form the image includes:

detecting whether the external light intensity exceeds a preset light intensity threshold;

if not, determining that the detection result is that the external light intensity cannot make the camera to form the image; or if yes, determining that the detection result is that the external light intensity can make the camera to form the image.

Further, the step of compensating the external light intensity according to the detection result using the internal light of the screen or the sensor of the camera comprises:

when the external light intensity cannot make the camera to form the image, the external light intensity is compensated by using the internal light of the screen, so that the compensated light intensity can make the camera to form the image; or when the external light intensity can make the camera to form the image, the external light intensity is compensated by using the sensor of the camera, so that the compensated light intensity is within a range of an actual light intensity of the external light.

Further, the step of that the external light intensity is compensated by using the internal light of the screen, includes:

turning on the internal light, and adjusting the internal light intensity to the preset light intensity threshold to achieve the compensation of the external light intensity, wherein the internal light intensity is a light intensity of the internal light passing through the screen to reach the camera.

Further, the internal light is the light emitted by pixel units within the screen;

the step of adjusting the internal light intensity to the preset light intensity threshold comprises:

calculating an actual light intensity required to obtain the internal light according to the preset light intensity threshold and a screen transmittance; and adjusting a driving current of the pixel units according to the actual light intensity required by the internal light to adjust the internal light intensity to the preset light intensity threshold.

Further, the step of that the external light intensity compensated by using the sensor of the camera, comprises:

calculating a range of a light intensity compensation according to the external light intensity and the screen transmittance; and turning on compensation light of the sensor of the camera, and adjusting the light intensity of the compensation light to the range of the light intensity compensation to achieve the compensation for the external light intensity.

Further, the step of calculating the range of the light intensity compensation according to the external light intensity and the screen transmittance includes:

obtaining an actual light intensity of the external light according to the external light intensity and the screen light transmittance, thereby obtaining a range of an actual light intensity of the external light; and calculating the range of the light intensity compensation according to the range of the actual light intensity and the external light intensity of the external light.

Further, the calculation formula of the range of the light intensity compensation is:

$$A'+Z=(0.9\sim1)A;$$

wherein A' is the external light intensity, Z is the range of the light intensity compensation, A is the actual light intensity of the external light, and (0.9~1) A is the range of the actual light intensity of the external light.

Further, before acquiring the external light intensity sensed by the camera under the display only under external light, further includes:

obtaining an internal light intensity sensed by the camera only under the internal light;

obtaining a current actual light intensity of the internal light; and calculating a ratio of the internal light intensity to the current actual light intensity of the internal light, and using the ratio as the screen transmittance.

The present invention provides a light compensation device for a camera under a display, and the display is an OLED screen, the device comprising:

an external light intensity acquiring module, used for acquiring an external light intensity sensed by the camera under the display only under an external light, the external light intensity is a light intensity of the external light passing through the screen to reach the camera;

a detecting module, used for detecting whether the external light intensity can make the camera to form an image; and a compensation module, used for compensating the external light intensity by using an internal light of the screen or a sensor of the camera according to a detection result.

Further, the detecting module is used for:

detecting whether the external light intensity exceeds a preset light intensity threshold;

if not, determining that the detection result is that the external light intensity cannot make the camera to form the image; or if yes, determining that the detection result is that the external light intensity can make the camera to form the image.

Further, the compensation module includes:

a first compensation unit, used for compensating the external light intensity by using the internal light of the screen when the external light intensity cannot make the camera to form the image, so that the compensated light intensity can make the camera to form the image; and a second compensation unit, used for compensating the external light intensity by using the sensor of the camera when the external light intensity can make the camera to form the image, so that the compensated light intensity is in the range of the actual light intensity of the external light.

Further, the first compensation unit is further used for:

turning on the internal light, and adjusting the internal light intensity to a preset light intensity threshold to achieve the compensate of the external light intensity, the internal light intensity is a light intensity of the internal light passing through the screen to reach the camera.

Further, the internal light is the light emitted by pixel units inside the screen;

the first compensation unit is further used for:

calculating an actual light intensity required to obtain the internal light according to the preset light intensity threshold and a screen transmittance; and adjusting a driving current of the pixel units according to the actual light intensity required by the internal light to adjust the internal light intensity to the preset light intensity threshold.

Further, the second compensation unit is further used for:

calculating a range of a light intensity compensation according to the external light intensity and a screen transmittance; and turning on a compensation light of the sensor of the camera, and adjusting the light intensity of the compensation light to the range of the light intensity compensation to achieve the compensation of the external light intensity.

Further, the second compensation unit is further used for:

obtaining an actual light intensity of the external light according to the external light intensity and the screen light transmittance, thereby obtaining a range of an actual light intensity of the external light; and calculating and obtaining the range of the light intensity compensation according to the range of the actual light intensity and the external light intensity of the external light.

Further, the calculation formula of the range of the light intensity compensation is:

$$A'+Z=(0.9\sim1)A;$$

wherein A' is the external light intensity, Z is the range of the light intensity compensation, A is the actual light intensity of the external light, and (0.9~1) A is the range of the actual light intensity of the external light.

Further, the device further includes:

an internal light intensity acquiring module, used for acquiring an internal light intensity sensed by the camera only under the internal light;

an actual light intensity acquiring module, used for acquiring an actual light intensity of the internal light; and a calculation module, used for calculating a ratio of the internal light intensity to a current actual light intensity of the internal light, and using the ratio as the screen transmittance.

BENEFICIAL EFFECTS

The beneficial effects of the present invention are: obtaining an external light intensity sensed by an under-screen camera only under an external light, detecting whether the external light intensity can make the camera to form an image, and proceeding different compensation to the external light intensity according to the detection result, thereby making the under-screen camera has the best imaging effect under the external light with different level.

DESCRIPTION OF DRAWINGS

The technical solutions and other advantageous effects of the present invention will be apparent from the following detailed description of embodiments of the invention.

DETAILED DESCRIPTION OF PREFERRED EMBODIMENTS

The technical solutions in the embodiments of the present invention are clearly and completely described in the following with reference to the drawings in the embodiments of the present invention. It is obvious that the described embodiments are only a part of the embodiments of the present invention, and not all of the embodiments. Based on the embodiments in the present invention, all other embodiments obtained by those skilled in the art without creative efforts are within the scope of the present invention.

Figure 1:
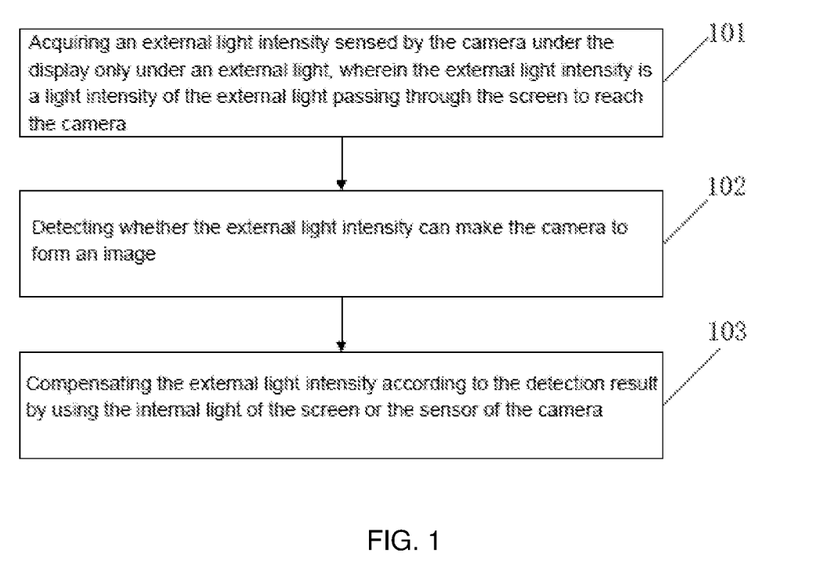
FIG. 1 is a schematic flowchart diagram of a light compensation method for a camera under a display according to an embodiment of the present invention.

As shown in FIG. 1, FIG. 1 is a schematic flowchart of a light compensation method for a camera under a display, and the display is an organic light emitting diode (OLED) screen of the embodiment of the present invention. The method includes the following steps:

Step 101: acquiring an external light intensity sensed by the camera under the display only under an external light, wherein the external light intensity is a light intensity of the external light passing through the screen to reach the camera.

Figure 2:
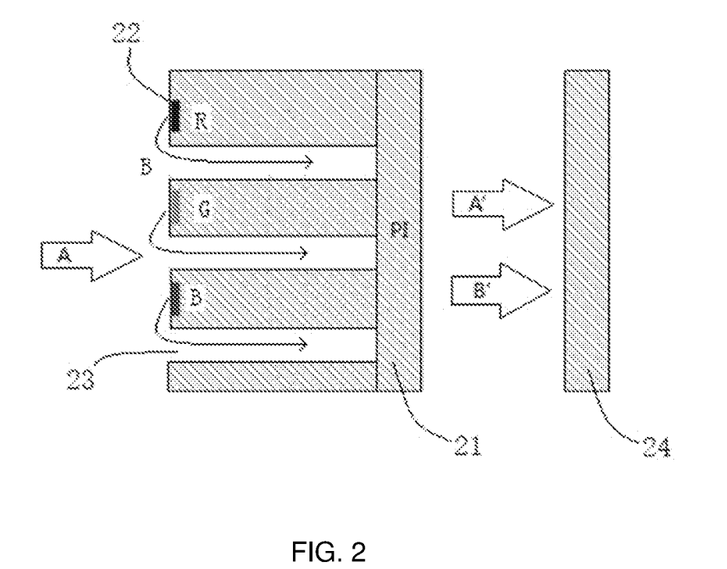
FIG. 2 is a schematic structural diagram of a display screen in a light compensation method for the camera under the display according to the embodiment of the present invention.

In this embodiment, as shown in FIG. 2, the display screen includes a base substrate 21 and pixel units 22. The main material of the base substrate 21 is polyimide (PI), and the PI material can effectively improve the transmittance. A plurality of holes 23 are disposed in gaps between the pixel units 22. Below the display screen, i.e. the side that the base substrate 21 away from the pixel units 22 is provided with a camera 24, and a sensor of the camera 24 corresponds to the position of holes 23. Among them, the camera 24 is an under-screen camera.

The light that the camera 24 can receive includes external light and internal light of the screen. The external light is the ambient light where the screen is disposed, such as natural light, indoor light, etc., and the internal light is the light emitted by the pixel units 22 inside the screen. Since the camera 24 is disposed below the screen, the external light and internal light need to pass through the screen to reach the camera 24. Therefore, the external light intensity sensed by the camera 24 is the intensity of the external light passing through the screen, the internal light intensity sensed by the camera 24 is the intensity of the internal light passing through the screen, and the external light intensity and the internal light intensity are lower than the actual light intensity of the external light and internal light, respectively. In addition, the sensor of the camera 24 can also turn on to compensate the light, which does not need to pass through the screen to reach the camera 24.

As shown in FIG. 2, A represents the actual light intensity of the external light, A' represents the external light intensity, B represents the actual light intensity of the internal light, and B' represents the internal light intensity. Since both the external light and the internal light include red light R, blue light B, and green light G, the actual light intensity A of the external light and the actual light intensity B of the internal light can be expressed by the following formula:

$$A = X1*a + X2*b + X3*c;$$

$$B = Y1*a + Y2*b + Y3*c.$$

wherein X1, X2, X3, Y1, Y2, and Y3 are coefficients, and a, b, and c are the light intensities of the red light R, blue light B, and green light G, respectively.

In this embodiment, the compensation lights of the internal light and the sensor of the camera are first turned off, so that the camera is only within the external light, the light intensity sensed by the camera is obtained at this time, and thus the light intensity is the external light intensity of the external light passing through the screen to reach the camera.

Step 102. detecting whether the external light intensity can make the camera to form an image.

In this embodiment, after the external light intensity is obtained, the external light intensity is detected to determine whether the external light intensity can make the camera to form the image. The determination is generally made by a preset light intensity threshold, which may be a light intensity threshold that makes the camera to form the image.

Specifically, step 102 includes:
detecting whether the external light intensity exceeds the preset light intensity threshold;
if not, determining that the detection result is that the external light intensity cannot make the camera to form the image;
if yes, determining that the detection result is that the external light intensity can make the camera to form the image.

It should be noted that if the external light intensity does not exceed the preset light intensity threshold, it is determined that the current external light is weak, and the external light intensity cannot make the camera to form the image; if the external light intensity exceeds the preset light intensity threshold, it is determined that the current external light is strong, and the external light intensity can make the camera to form the image. In a specific embodiment, the preset light intensity threshold is 30 cd/m$^2$.

Step 3. compensating the external light intensity according to a detection result using an internal light of the screen or a sensor of the camera.

In this embodiment, the external light intensity is compensated differently according to different detection results, so that the camera achieves a best imaging effect under different external light.

Specifically, step 103 includes:
when the external light intensity cannot make the camera to form the image, the external light intensity is compensated by using the internal light of the screen, so that the compensated light intensity can make the camera to form the image;
when the external light intensity can make the camera to form the image, the external light intensity is compensated by using the sensor of the camera, so that the compensated light intensity is within a range of an actual light intensity of the external light.

In a specific embodiment, the external light intensity cannot make the camera to form the image. This indicates that the external light is weak at this time. When the external light is weak, the compensation proceeded by the sensor of the camera generates a large noise, and thus the internal light intensity is compensated by the internal light of the screen, which makes the camera to form the image.

Further, the step of that the external light intensity is compensated by using the internal light of the screen, specifically includes:
turning on the internal light, and adjusting the internal light intensity to the preset light intensity threshold to achieve the compensation of the external light intensity, wherein the internal light intensity is a light intensity of the internal light passing through the screen to reach the camera.

Further, adjusting the internal light intensity to the preset light intensity threshold specifically includes:
calculating a range of a light intensity compensation according to the external light intensity and the screen transmittance; and
adjusting a driving current of the pixel units according to the actual light intensity required by the internal light to adjust the internal light intensity to the preset light intensity threshold.

It should be noted that the internal light is turned on by the chip IC disposed within the display screen, and the actual light intensity of the internal light is adjusted by adjusting the driving current of the pixel units, thereby adjusting the internal light intensity and thus the external light intensity and the internal light intensity of the camera can make the camera to form the image. The adjustment of the actual light intensity of the internal light may be performed by separately adjusting the light intensity of the red light R, the blue light B or the green light G in the internal light, or adjusting the overall light intensity of the internal light.

The internal light intensity can be adjusted to the preset light intensity threshold to ensure that the camera can be made to form the image. In order to adjust the internal light intensity to the preset light intensity threshold, the actual light intensity required for the internal light is calculated according to the preset light intensity threshold and the screen light transmittance, so as to adjust the drive current of the pixel units according to the actual light intensity required for the internal light. When the actual light intensity of the internal light is adjusted to the required actual light intensity, the internal light intensity is the preset light intensity threshold.

For example, when it is detected that the external light intensity A' is 20 cd/m², the camera 24 cannot be made to form the image, and the external light is compensated by the internal light. If the screen transmittance is 50% and the internal light intensity to be compensated is 30 cd/m², the actual light intensity required by the internal light is calculated to 60 cd/m². Adjusting the driving current of the pixel units so that the actual light intensity of the internal light reaches 60 cd/m², the internal light intensity reaches 30 cd/m², and the compensated light intensity is: A'+B'=20+30=50 cd/m². At this time, the camera 24 can be made to form the image.

In another specific embodiment, the external light intensity can make the camera to form the image, which indicates that the external light is strong at this time. In the case of strong external light, the external light intensity can be directly compensated by the sensor of the camera, so that the compensated light intensity is within the range of the actual light intensity of the external light, which makes the light intensity sensed by the camera is close to the actual light intensity of the external light. The actual light intensity of the light is beneficial to the make the camera to truly form the image.

Further, the step of that the external light intensity compensated by using the sensor of the camera, comprises:

calculating a range of a light intensity compensation according to the external light intensity and the screen transmittance; and turning on a compensation light of the sensor of the camera, and adjusting the light intensity of the compensation light to the range of the light intensity compensation to achieve the compensation of the external light intensity.

Further, the step of calculating the range of the light intensity compensation according to the external light intensity and the screen transmittance includes:

obtaining an actual light intensity of the external light according to the external light intensity and the screen light transmittance, thereby obtaining a range of an actual light intensity of the external light; and calculating the range of the light intensity compensation according to the range of the actual light intensity and the external light intensity of the external light.

It should be noted that the compensation light of the sensor of the camera is turned on to adjust the light intensity of the compensation light to the range of the light intensity compensation, so that the external light intensity and the light intensity of the compensation light are used together as the light intensity received by the camera, so that the light intensity received by the camera is thus close to the actual light intensity of the external light.

The range of the light intensity compensation can be calculated according to the external light intensity and the screen transmittance. Specifically, the actual light intensity of the external light intensity at this time is calculated by the external light intensity and the screen light transmittance, and the range of the actual light intensity of the external light is calculated according to the default range. Finally, the range of the light intensity compensation can be calculated according to the range of the actual light intensity of the external light and the external light intensity. The calculation formula is as follows:

$$A'+Z=(0.9\sim1)A;$$

wherein A' is the external light intensity, Z is the range of the light intensity compensation, A is the actual light intensity of the external light, and (0.9~1) A is the range of the actual light intensity of the external light.

For example, when detecting the external light intensity is 60 cd/m², the camera can be made to form the image, but the imaging effect of the camera is not the best, so the external light intensity needs to be compensated. If the screen transmittance is 50%, the actual light intensity A of the external light is calculated to be 120 cd/m². By adjusting the intensity of the compensation light of the camera sensor to 60 cd/m², the intensity of the light received by the camera is equal to the actual light intensity of the external light, which is beneficial for the camera to be made to form the truly image.

Further, before acquiring the external light intensity sensed by the camera under the display only under external light, further includes:

obtaining an internal light intensity sensed by the camera only under the internal light;

obtaining a current actual light intensity of the internal light;

and calculating a ratio of the internal light intensity to the current actual light intensity of the internal light, and using the ratio as the screen transmittance.

It should be noted that the screen transmittance must be determined before compensating for the external light intensity. The screen is placed in a dark environment where there is no external light, the compensation light of the camera sensor is turned off and the internal light is turned on, so that the light intensity sensed by the camera 24 is only the internal light intensity B'. The current actual light intensity of the internal light is B, that is, the light intensity emitted by the pixel units inside the screen can be obtained by detection. The ratio between the external light intensity B' and the current actual light intensity B of the internal light is the screen light transmittance B'/B. As shown in FIG. 2, the screen light transmittance may be the light transmittance of the base substrate 21.

It can be seen from the above, the light compensation method for the camera under the display of the embodiment can obtain the external light intensity sensed by the under-screen camera only under the external light, detect whether the external light intensity can make the camera to form the image, and proceed different compensation to the external light intensity according to the detection result, thereby making the under-screen camera has the best imaging effect under the external light with different level.

Figure 3:
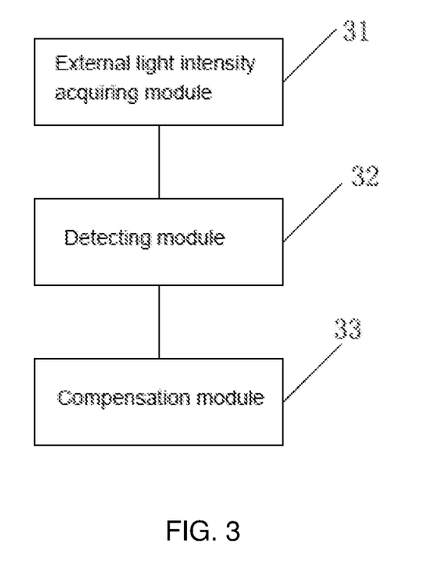
FIG. 3 is a schematic structural diagram of a light compensation device for the camera under the display according to the embodiment of the present invention.

As shown in FIG. 3, FIG. 3 is a schematic structural diagram of a light compensation device for the camera under the display of the embodiment of the present invention, which can implement all the processes of the light compensation method of the camera under the display. The device comprises:

an external light intensity acquiring module 31, used for acquiring an external light intensity sensed by the camera under the display only under an external light, the external light intensity is a light intensity of the external light passing through the screen to reach the camera;

a detecting module 32, used for detecting whether the external light intensity can make the camera to form an image; and a compensation module 33, used for compensating the external light intensity by using an internal light of the screen or a sensor of the camera according to a detection result.

Further, the detecting module is used for:

detecting whether the external light intensity exceeds a preset light intensity threshold;

if not, determining that the detection result is that the external light intensity cannot make the camera to form the image; or if yes, determining that the detection result is that the external light intensity can make the camera to form the image.

Further, the compensation module specifically includes:

a first compensation unit, used for compensating the external light intensity by using the internal light of the screen when the external light intensity cannot make the camera to form the image, so that the compensated light intensity can make the camera to form the image; and a second compensation unit, used for compensating the external light intensity by using the sensor of the camera when the external light intensity can make the camera to form the image, so that the compensated light intensity is in the range of the actual light intensity of the external light.

Further, the first compensation unit is further used for:

turning on the internal light, and adjusting the internal light intensity to the preset light intensity threshold to achieve the compensate of the external light intensity, and the internal light intensity is a light intensity of the internal light passing through the screen to reach the camera.

Further, the internal light is the light emitted by pixel units inside the screen;

the first compensation unit is further used for:

calculating an actual light intensity required to obtain the internal light according to the preset light intensity threshold and a screen transmittance; and adjusting a driving current of the pixel units according to the actual light intensity required by the internal light to adjust the internal light intensity to the preset light intensity threshold.

Further, the second compensation unit is further used for:

calculating a range of a light intensity compensation according to the external light intensity and a screen transmittance; and turning on a compensation light of the sensor of the camera, and adjusting the light intensity of the compensation light to the range of the light intensity compensation to achieve the compensation of the external light intensity.

Further, the second compensation unit is further used for:

obtaining an actual light intensity of the external light according to the external light intensity and the screen light transmittance, thereby obtaining a range of the actual light intensity of the external light; and calculating and obtaining the range of the light intensity compensation according to the range of the actual light intensity and the external light intensity of the external light Further, the calculation formula of the range of the light intensity compensation is:

$$A'+Z=(0.9\sim1)A;$$

wherein $A'$ is the external light intensity, $Z$ is the range of the light intensity compensation, $A$ is the actual light intensity of the external light, and $(0.9\sim1)A$ is the range of the actual light intensity of the external light.

Further, the device further includes:

an internal light intensity acquiring module, used for acquiring an internal light intensity sensed by the camera only under the internal light;

an actual light intensity acquiring module, used for acquiring an actual light intensity of the internal light; and a calculation module, used for calculating a ratio of the internal light intensity to a current actual light intensity of the internal light, and using the ratio as the screen transmittance.

In summary, the light compensation device for the camera under a display, and the display is an OLED screen provided by the embodiment can obtain the external light intensity sensed by the under-screen camera only under external light, detect whether the external light intensity can make the camera to form an image, and proceed different compensation to the external light intensity according to the detection result, thereby making the under-screen camera has the best imaging effect under the external light with different level.

In the above, various other corresponding changes and modifications can be made according to the technical solutions and technical ideas of the present invention to those skilled in the art, and all such changes and modifications are within the scope of the claims of the present invention.

What is claimed is:

1. A light compensation method for a camera under a display, comprising:

acquiring an external light intensity sensed by the camera under the display only under an external light, wherein the external light intensity is a light intensity of the external light passing through the screen to reach the camera; and detecting whether the external light intensity can make the camera form an image, and compensating for the external light intensity according to a detection result by using either an internal light of the screen or a sensor of the camera.

2. The light compensation method for the camera under the display as claimed in claim 1, wherein the step of detecting whether the external light intensity can make the camera form the image comprises:

detecting whether the external light intensity exceeds a preset light intensity threshold;

if not, determining that the detection result is that the external light intensity cannot make the camera form the image; or if yes, determining that the detection result is that the external light intensity can make the camera form the image.

3. The light compensation method for the camera under the display as claimed in claim 1, wherein the step of compensating for the external light intensity according to the detection result by using either the internal light of the screen or the sensor of the camera comprises:

when the external light intensity cannot make the camera form the image, the external light intensity is compensated by using the internal light of the screen, so that a compensated light intensity can make the camera form the image; or when the external light intensity can make the camera form the image, the external light intensity is compensated by using the sensor of the camera, so that the compensated light intensity is within a range of an actual light intensity of the external light.

4. The light compensation method for the camera under the display as claimed in claim 3, wherein the step of that the external light intensity is compensated by using the internal light of the screen, comprises:
turning on the internal light, and adjusting the internal light intensity to the preset light intensity threshold to achieve a compensation for the external light intensity, wherein the internal light intensity is a light intensity of the internal light passing through the screen to reach the camera.

5. The light compensation method for the camera under the display as claimed in claim 4, wherein the internal light is the light emitted by pixel units within the screen;
the step of adjusting the internal light intensity to the preset light intensity threshold comprises:
calculating an actual light intensity required to obtain the internal light according to the preset light intensity threshold and a screen transmittance; and
adjusting a driving current of the pixel units according to the actual light intensity required by the internal light to adjust the internal light intensity to the preset light intensity threshold.

6. The light compensation method for the camera under the display as claimed in claim 5, wherein before acquiring the external light intensity sensed by the camera under the display only under the external light, further comprises:
obtaining an internal light intensity sensed by the camera only under the internal light;
obtaining a current actual light intensity of the internal light; and
calculating a ratio of the internal light intensity to the current actual light intensity of the internal light, and using the ratio as the screen transmittance.

7. The light compensation method for the camera under the display as claimed in claim 3, wherein the step of that the external light intensity compensated by using the sensor of the camera, comprises:
calculating a range of a light intensity compensation according to the external light intensity and the screen transmittance; and
turning on compensation light of the sensor of the camera, and adjusting the light intensity of the compensation light to the range of the light intensity compensation to achieve a compensation for the external light intensity.

8. The light compensation method for the camera under the display as claimed in claim 7, wherein the step of calculating the range of the light intensity compensation according to the external light intensity and the screen transmittance comprises:
obtaining the actual light intensity of the external light according to the external light intensity and the screen light transmittance, thereby obtaining the range of the actual light intensity of the external light; and
calculating the range of the light intensity compensation according to the range of the actual light intensity and the external light intensity of the external light.

9. The light compensation method for the camera under the display as claimed in claim 8, wherein a calculation formula of the range of the light intensity compensation is:

$$A'+Z=(0.9\sim1)A;$$

wherein $A'$ is the external light intensity, $Z$ is the range of the light intensity compensation, $A$ is the actual light intensity of the external light, and $(0.9\sim1)A$ is the range of the actual light intensity of the external light.

10. A light compensation device for a camera under a display, the device comprising a processor for executing a method, the method comprising:
acquiring an external light intensity sensed by the camera under the display only under an external light, wherein the external light intensity is a light intensity of the external light passing through the screen to reach the camera;
detecting whether the external light intensity can make the camera form an image; and
compensating for the external light intensity by using either an internal light of the screen or a sensor of the camera according to a detection result.

11. The light compensation device for the camera under the display as claimed in claim 10, wherein the detecting whether the external light intensity can make the camera form the image comprises:
detecting whether the external light intensity exceeds a preset light intensity threshold;
if not, determining that the detection result is that the external light intensity cannot make the camera form the image; or
if yes, determining that the detection result is that the external light intensity can make the camera form the image.

12. The light compensation device for the camera under the display as claimed in claim 10, wherein the compensating for the external light intensity by using either the internal light of the screen or the sensor of the camera according to the detection result comprises:
compensating for the external light intensity by using the internal light of the screen when the external light intensity cannot make the camera form the image, so that a compensated light intensity can make the camera form the image; and
compensating for the external light intensity by using the sensor of the camera when the external light intensity can make the camera form the image, so that the compensated light intensity is in a range of an actual light intensity of the external light.

13. The light compensation device for the camera under the display as claimed in claim 12, wherein the compensating for the external light intensity by using the internal light of the screen comprises:
turning on the internal light, and adjusting the internal light intensity to a preset light intensity threshold to achieve a compensation for the external light intensity, wherein the internal light intensity is a light intensity of the internal light passing through the screen to reach the camera.

14. The light compensation device for the camera under the display as claimed in claim 13, wherein the internal light is light emitted by pixel units inside the screen; and
the adjusting the internal light intensity to the preset light intensity threshold comprises:
calculating an actual light intensity required to obtain the internal light according to the preset light intensity threshold and a screen transmittance; and
adjusting a driving current of the pixel units according to the actual light intensity required by the internal light to adjust the internal light intensity to the preset light intensity threshold.

15. The light compensation device for the camera under the display as claimed in claim 12, wherein the compensating for the external light intensity by using the sensor of the camera comprises:

calculating a range of a light intensity compensation according to the external light intensity and a screen transmittance; and turning on a compensation light of the sensor of the camera, and adjusting the light intensity of the compensation light to the range of the light intensity compensation to achieve a compensation for the external light intensity.

16. The light compensation device for the camera under the display as claimed in claim 15, wherein the calculating the range of the light intensity compensation according to the external light intensity and the screen transmittance comprises:

obtaining the actual light intensity of the external light according to the external light intensity and the screen light transmittance, thereby obtaining the range of the actual light intensity of the external light; and calculating and obtaining the range of the light intensity compensation according to the range of the actual light intensity and the external light intensity of the external light.

17. The light compensation device for the camera under the display as claimed in claim 16, wherein a calculation formula of the range of the light intensity compensation is:

$$A'+Z=(0.9\sim1)A;$$

wherein A' is the external light intensity, Z is the range of the light intensity compensation, A is the actual light intensity of the external light, and (0.9~1) A is the range of the actual light intensity of the external light.

18. The light compensation device for the camera under the display as claimed in claim 14, wherein the method further comprises before acquiring the external light intensity sensed by the camera under the display only under the external light:

acquiring an internal light intensity sensed by the camera only under the internal light;

acquiring an actual light intensity of the internal light; and calculating a ratio of the internal light intensity to a current actual light intensity of the internal light, and using the ratio as the screen transmittance.

* * * * *